(12) United States Patent
Samuelsson et al.

(10) Patent No.: US 11,116,173 B2
(45) Date of Patent: Sep. 14, 2021

(54) CARTRIDGE FOR A TEATCUP, AND A TEATCUP

(71) Applicant: DELAVAL HOLDING AB, Tumba (SE)

(72) Inventors: David Samuelsson, Tumba (SE); Anna Andersson, Tumba (SE)

(73) Assignee: DeLaval Holding AB, Tumba (SE)

( * ) Notice: Subject to any disclaimer, the term of this patent is extended or adjusted under 35 U.S.C. 154(b) by 300 days.

(21) Appl. No.: 16/098,780

(22) PCT Filed: May 3, 2017

(86) PCT No.: PCT/SE2017/050426
§ 371 (c)(1),
(2) Date: Nov. 2, 2018

(87) PCT Pub. No.: WO2017/192093
PCT Pub. Date: Nov. 9, 2017

(65) Prior Publication Data
US 2019/0133068 A1    May 9, 2019

(30) Foreign Application Priority Data

May 4, 2016 (SE) .................................. 1650605-7

(51) Int. Cl.
*A01J 5/08* (2006.01)
*A01J 5/16* (2006.01)

(52) U.S. Cl.
CPC .. *A01J 5/08* (2013.01); *A01J 5/16* (2013.01)

(58) Field of Classification Search
CPC ........ A01J 5/04; A01J 5/06; A01J 5/08; A01J 5/16

(Continued)

(56) References Cited

U.S. PATENT DOCUMENTS 4,269,143 A    5/1981    Erbach
4,651,676 A    3/1987    Kupres
(Continued)

FOREIGN PATENT DOCUMENTS

CN    105163578 A    12/2015
CN    105163758 A    12/2015
(Continued)

OTHER PUBLICATIONS

International Search Report and Written Opinion, dated Jul. 19, 2017, from corresponding PCT application No. PCT/SE2017/050426.

(Continued)

*Primary Examiner* — Brady W Frazier
(74) *Attorney, Agent, or Firm* — Nixon & Vanderhye (57) ABSTRACT

A teatcup and a cartridge insertable into a connector of the teatcup to be attached to the teat of an animal to be milked are disclosed. The cartridge includes an elongated sleeve, having an upper end section and a lower end section, and a teatcup liner pre-mounted in the elongated sleeve. The teatcup liner includes an upper end portion located at the upper end section, a lower end portion located at the lower end section, and a barrel portion extending between the upper end portion and the lower end portion. The elongated sleeve includes three separate primary hook members provided circumferentially after each other on an outer surface of the elongated sleeve. Each primary hook member has a lower slide surface sloping upwardly and outwardly, and an upper hook surface extending inwardly.

16 Claims, 7 Drawing Sheets

(58) Field of Classification Search
USPC .................... 119/14.47, 14.48, 14.49, 14.53
See application file for complete search history.

(56) References Cited

U.S. PATENT DOCUMENTS

| | | | |
|---|---|---|---|
| 6,058,879 A | 5/2000 | Miefalk | |
| 6,308,656 B1 | 10/2001 | Milbrath | |
| 9,635,829 B2* | 5/2017 | La Torre | A01J 5/08 |
| 2004/0050334 A1 | 3/2004 | Miller | |
| 2016/0007559 A1* | 1/2016 | Andersson | A01J 5/044 119/14.46 |
| 2016/0066531 A1 | 3/2016 | La Torre et al. | |

FOREIGN PATENT DOCUMENTS

| | | |
|---|---|---|
| EP | 0 566 977 A1 | 10/1993 |
| WO | 2014/178783 A1 | 11/2014 |

OTHER PUBLICATIONS

International-Type Search Report, dated Dec. 20, 2016, from corresponding SE application No. 1650605-7.
Office Action issued in Chinese Patent Application No. 201780027171.5 dated Nov. 20, 2020 with English machine translation provided.

* cited by examiner

CARTRIDGE FOR A TEATCUP, AND A TEATCUP

TECHNICAL FIELD OF THE INVENTION

The present invention refers to a cartridge. The invention also refers to a teatcup comprising a cartridge.

BACKGROUND AND PRIOR ART

WO 2014/178783 discloses a teatcup comprising a connector and a cartridge. The connector is associated with or comprises an outer shell. The teatcup is configured to be attached to the teat of an animal to be milked. The cartridge comprises an elongated sleeve extending in parallel with a longitudinal central axis, and has an upper end section and a lower end section. A teatcup liner is pre-mounted in the elongated sleeve and has an inner space for receiving the teat. A pulsation chamber is formed between an inner side of the elongated sleeve and an outer side of the teatcup liner. The teatcup liner comprises an upper end portion located at the upper end section of the elongated sleeve, a lower end portion located at the lower end section of the elongated sleeve, and a barrel portion extending between the upper end portion and the lower end portion.

When inserting the cartridge into the connector of the teatcup, and when removing the cartridge from the connector, it could happen that the teatcup liner is rotated in relation to the elongated sleeve as the insertion and/or the removal includes a rotary movement. The teatcup liner may then be twisted, which significantly decreases the performance of the teatcup liner. This is in particular a problem, when the barrel portion of the teatcup liner at least in a rest state has a polygonal cross-sectional shape defining a plurality of corner portions and a plurality of side portions, each connecting two of said corner portions. Such polygonal teatcup liners are sensible to twisting.

SUMMARY OF THE INVENTION

The object of the present invention is remedy the problems discussed above and to provide an improved cartridge for a teatcup. In particular, it is aimed at a cartridge in which twisting of the teatcup liner in relation to the elongated sleeve can be avoided.

This object is achieved by the cartridge defined above, which is characterized in that the elongated sleeve comprises three separate primary hook members provided circumferentially after each other on an outer surface of the elongated sleeve, and that each of the primary hook members has a lower slide surface sloping upwardly and outwardly, and a upper hook surface extending inwardly.

Such sloping slide surface and upper hook surface enable an easy insertion of the cartridge in the connector. The cartridge may be axially pushed into the connector without being rotated. No twisting of the teatcup liner may thus occur.

The inserted position is easy to detect, when the cartridge has reached its final axial position.

The pushing force may be evenly distributed on the three sloping surface without any risk of tilting the cartridge in relation to the connector.

According to an embodiment of the invention, each of the primary hook members is configured to interact with a respective heel member, which heel members are provided circumferentially after each other on an inner surface of the connector, wherein the primary hook members and the heel members define a primary rotary position of the cartridge in relation to the connecter, and wherein the cartridge is introducible along the longitudinal central axis into the connector when being in the primary rotary position.

According to an embodiment of the invention, each of the primary hook members is configured to be engaged by a respective one of the heel members when the cartridge has been introduced into the connector and is in said primary rotary position.

According to an embodiment of the invention, the primary hook members are equidistantly distributed after each other. The pushing force is thus symmetrically and evenly distributed on the three primary hook members.

According to an embodiment of the invention, the elongated sleeve comprises three separate passages provided circumferentially after each other on the outer surface of the elongated sleeve so that the primary hook members and the passages are provided after each other in an alternating order around the outer surface of the elongated sleeve.

Such passages permits the cartridge to be easily removed by being axially pulled out from the teatcup after having been rotated from a primary rotary position to a secondary rotary position in which the passages are aligned with the heel members.

According to an embodiment of the invention, the elongated sleeve comprises two secondary hook members, each projecting outwardly in a respective one of the passages, wherein each of the secondary hook members has a lower hook surface extending inwardly and an upper slide surface sloping upwardly and inwardly.

Such secondary hook members may prevent the cartridge from being inserted in an incorrect rotary position, i.e. when the primary hook members are not aligned with the heel members.

According to an embodiment of the invention, the secondary hook members are configured to interact with the heel members to prevent the cartridge from being inserted when the cartridge is not in the primary rotary position.

According to an embodiment of the invention, the elongated sleeve comprises at least one stop member extending outwardly from the outer surface and being provided adjacent to and axially above one of the primary hook members.

Such stop member may prevent the cartridge from being rotated along an incorrect rotary direction in relation to the connector.

According to an embodiment of the invention, the stop member is configured to interact with at least one of the heel members to permit the cartridge to be rotated around the longitudinal central axis in relation to the connector between the primary rotary position and a secondary rotary position, in which the cartridge is removable from the connector.

According to an embodiment of the invention, the elongated sleeve comprises three surface areas, each having a circular cylindrical extension and being provided above a respective one of the primary hook members.

According to an embodiment of the invention, the elongated sleeve comprises a seal member which extends around the outer surface of the elongated sleeve and is configured to abut an inner surface of the connector when the cartridge is in the inserted position.

The object is also achieved by the teatcup initially defined comprises a connector and a cartridge as defined above. The connector comprises or is associated with an outer shell, which protects the cartridge and which adds a weight to the teatcup. The outer shell may be an integrated part of the connector.

Such a teatcup offers an easy and quick replacement of the cartridge without any risk of defects on the cartridge, especially twisting of the teatcup liner.

According to an embodiment of the invention, the connector comprises three heel members, provided circumferentially after each other on an inner surface of the connector, wherein each of the primary hook members interacts with a respective one of the heel members, wherein the primary hook members and the heel members define a primary rotary position of the cartridge in relation to the connecter, and wherein the cartridge is introducible along the longitudinal central axis into the connector to an inserted position when the cartridge is in the primary rotary position.

According to an embodiment of the invention, the elongated sleeve comprises three separate passages, provided circumferentially after each other on the outer surface of the elongated sleeve, and two secondary hook members, each projecting outwardly in a respective one of the passages, wherein the secondary hook members interact with the heel members to prevent the cartridge from being inserted when the cartridge is not in the primary rotary position.

According to an embodiment of the invention, the elongated sleeve comprises at least one stop member extending outwardly from the outer surface and being provided adjacent to and axially above one of the primary hook members, wherein the stop member interacts with at least one of the heel members to permit the cartridge to be rotated around the longitudinal central axis in relation to the connector between the primary rotary position and a secondary rotary position, in which the cartridge is removable from the connector.

According to an embodiment of the invention, the elongated sleeve comprises three surface areas, each having a circular cylindrical extension and being provided above a respective one of the primary hook members, wherein each surface area is located opposite to a main surface of a respective heel member when the cartridge is in the secondary rotary position.

According to an embodiment of the invention, the elongated sleeve comprises a seal member, which extends around the outer surface of the elongated sleeve and abuts an inner surface of the connector when the cartridge is in the inserted position.

BRIEF DESCRIPTION OF THE DRAWINGS

The present invention will now be explained more closely by means of a description of various embodiments and with reference to the drawings attached hereto.

DETAILED DESCRIPTION OF VARIOUS EMBODIMENTS OF THE INVENTION

Figure 1:
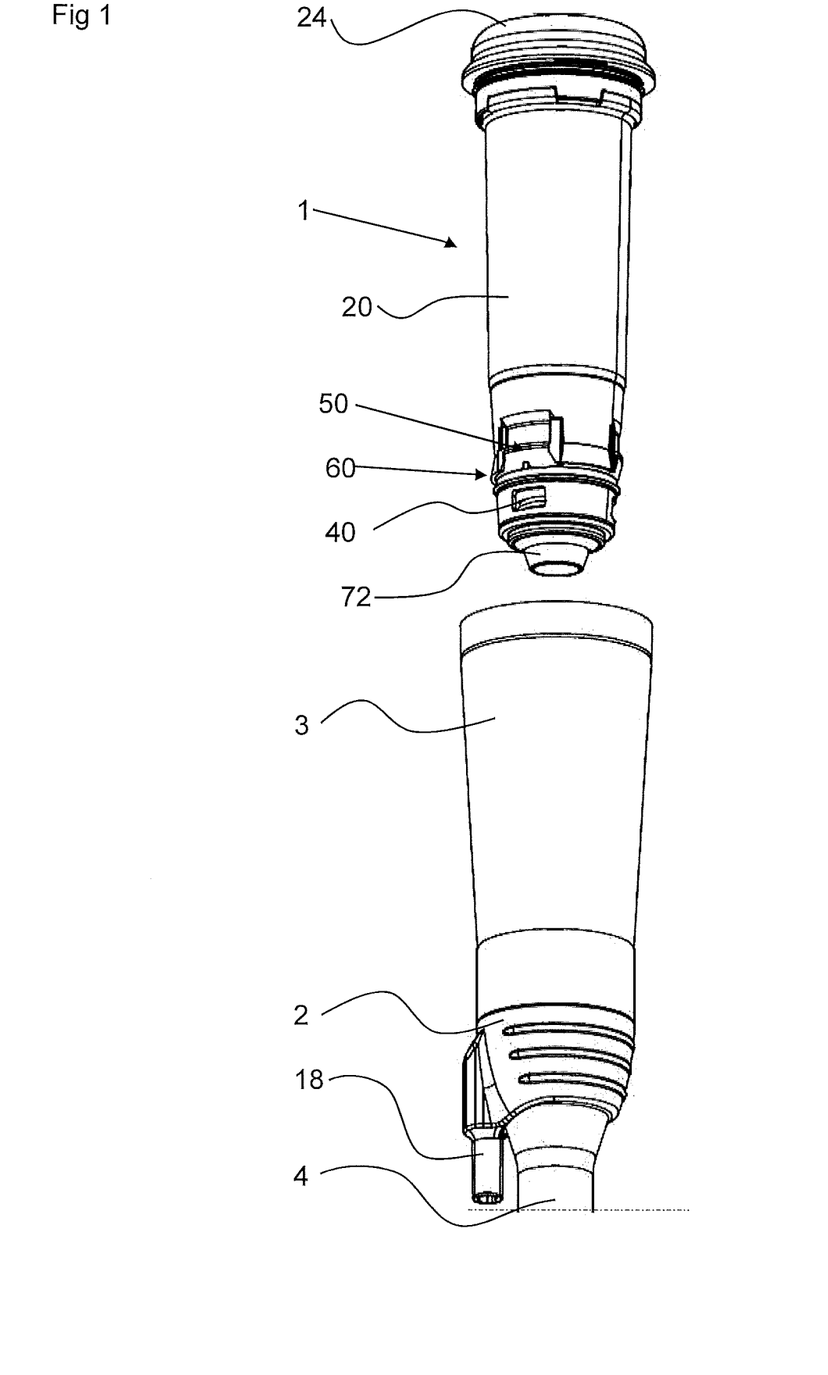
FIG. 1 discloses an exploded perspective view of a teatcup according to an embodiment of the invention.
Figure 2:
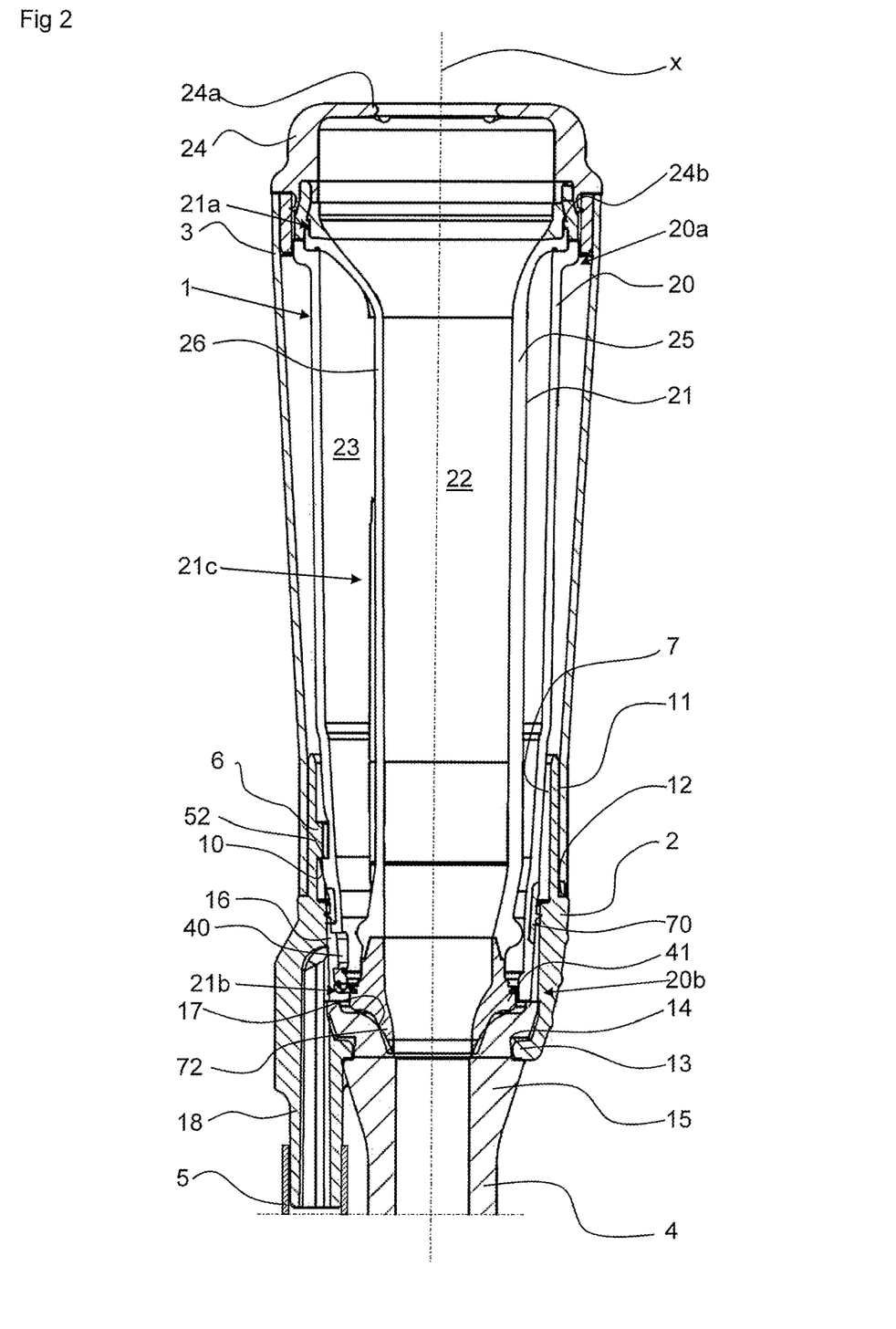
FIG. 2 discloses a longitudinal sectional view of the teatcup in FIG. 1.

FIGS. 1 and 2 disclose a teatcup to be attached to the teat of an animal to be milked. The teatcup comprises a cartridge 1, a connector 2. The connector 2 comprises or is associated with an outer shell 3. The outer shell 3 may be an integrated part of the connector 2.

In the following, the word "upper" refer to any part being closest to the teat and the udder of the animal during milking, and the word "lower" to any part being most remote from the teat and the udder during milking.

The teatcup may comprise or be connected to a milk conduit 4, such as a short milk conduit or a long milk conduit, and to a pulse conduit 5.

A longitudinal central axis x extends through and along the teatcup, i.e. through the cartridge 1 and the connector 2. The longitudinal central axis x may also extend through and along a part of the milk conduit 4 when it is in a rest state as partly indicated in FIG. 2.

Figure 3:
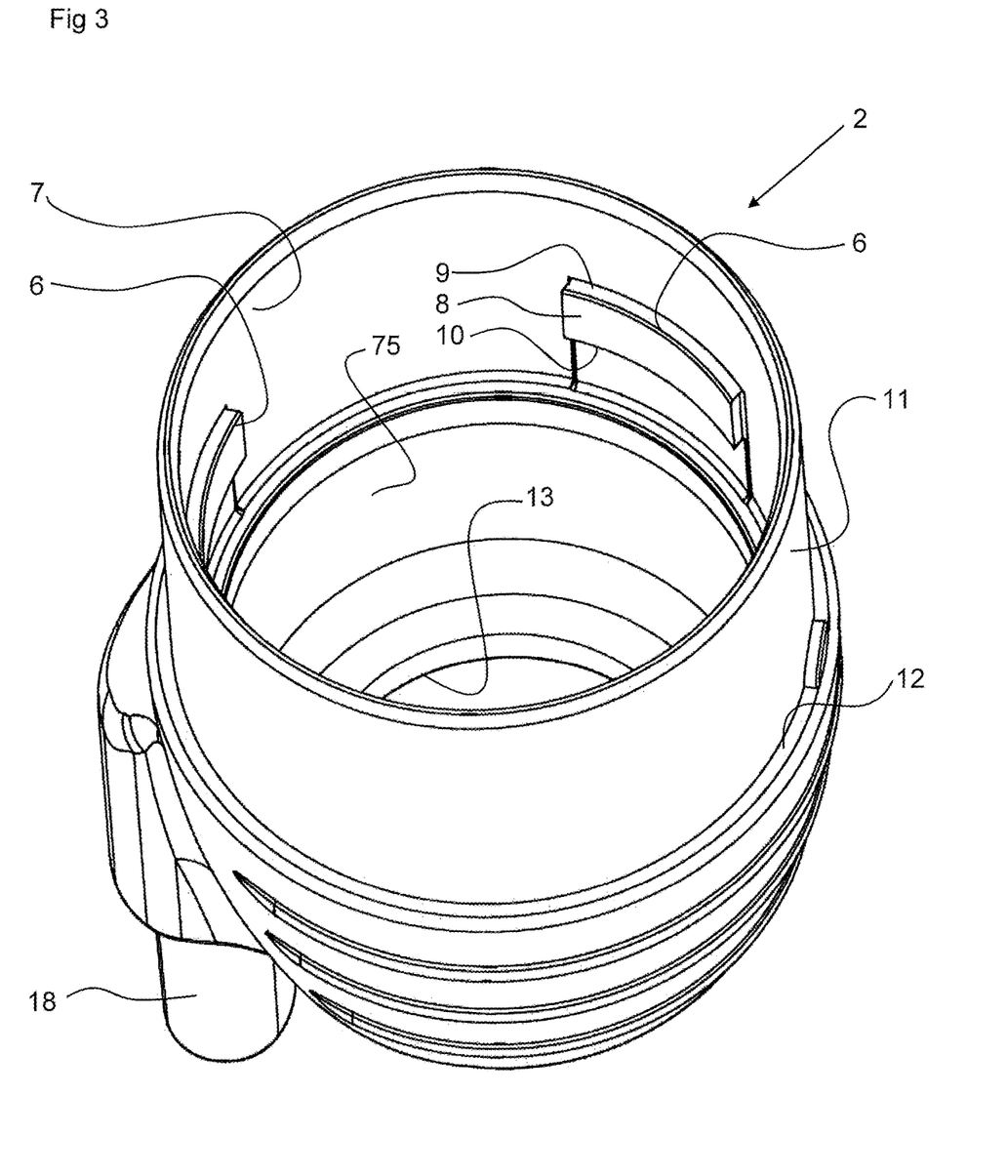
FIG. 3 discloses a perspective view from above of a connector of the teatcup in FIG. 1.

The connector 2 comprises three heel members 6, which are provided circumferentially after each other on an upper inner surface 7 of the connector 2, see in particular FIG. 3, in which two of the heel members 6 are visible. The heel members 6 are equidistantly distributed around the longitudinal central axis x.

The heel members 6 project from the upper inner surface 7 towards the longitudinal central axis x. Each heel member 6 has a rectangular shape when seen in a radial direction. Each heel member 6 has a main surface 8, which may extend parallel with the upper inner surface 7. The main surface 8 is circular cylindrical, or substantially circular cylindrical.

Moreover, each heel member 6 has an upper side surface 9 and a lower side surface 10. The upper and lower side surfaces 9 and 10 may extend perpendicularly between the main surface 8 and the upper inner surface 7, and thus in parallel with each other.

A chamfer may be provided at the transition between the upper surface 9 and the main surface 8.

The connector 2 comprises an upper outer surface 11 opposite to the upper inner surface 7. The upper outer surface 11 extends from an upper end of the connector 2 and ends at a shoulder 12. The upper outer surface 11 is circular cylindrical, or substantially circular cylindrical.

The outer shell 3 is provided onto the upper outer surface 11 of the connector 2, as can be seen in FIG. 2, so that the connector 2 and the outer shell 3 form a unit. For instance, the outer shell 3 may be press-fitted onto the upper outer surface 11. A lower end of the outer shell 3 abuts the shoulder 12.

The connector 2 comprises a flange 13 extending inwardly towards the longitudinal central axis x, especially radially inwardly. The flange 13 may be provided at the bottom end of the connector 2. The flange 13 may engage a corresponding groove 14 in an upper portion 15 of the milk conduit 4 in order to releasably attach the connector 2 to the milk conduit 4 as can be seen in FIGS. 2 and 6.

Figure 6:
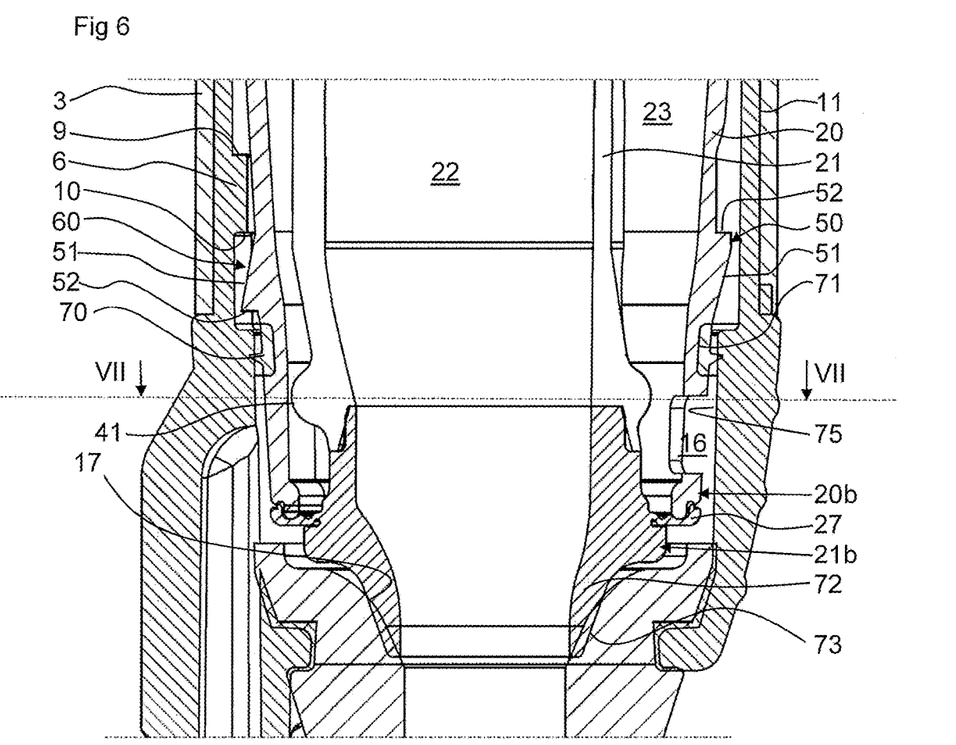
FIG. 6 discloses a longitudinal sectional view of a lower part of the teatcup in FIG. 1.

The upper portion 15 of the milk conduit 4 is at least partly located in a closed space 16 formed by and between the connector 2 and the cartridge 1, see FIGS. 2 and 6.

The upper portion 15 of the milk conduit 4 also forms a seal surface 17, which is annular and tapers downwardly as can be seen in FIGS. 2 and 6. The seal surface 17 is to be explained below.

Furthermore, the connector 2 comprises a pulse nipple 18 forming a communication channel to the closed space 16. The pulse nipple 18 is connected to the pulse conduit 5. The pulse nipple 18 extends downwardly from the connector 2.

Figures 4, 5:
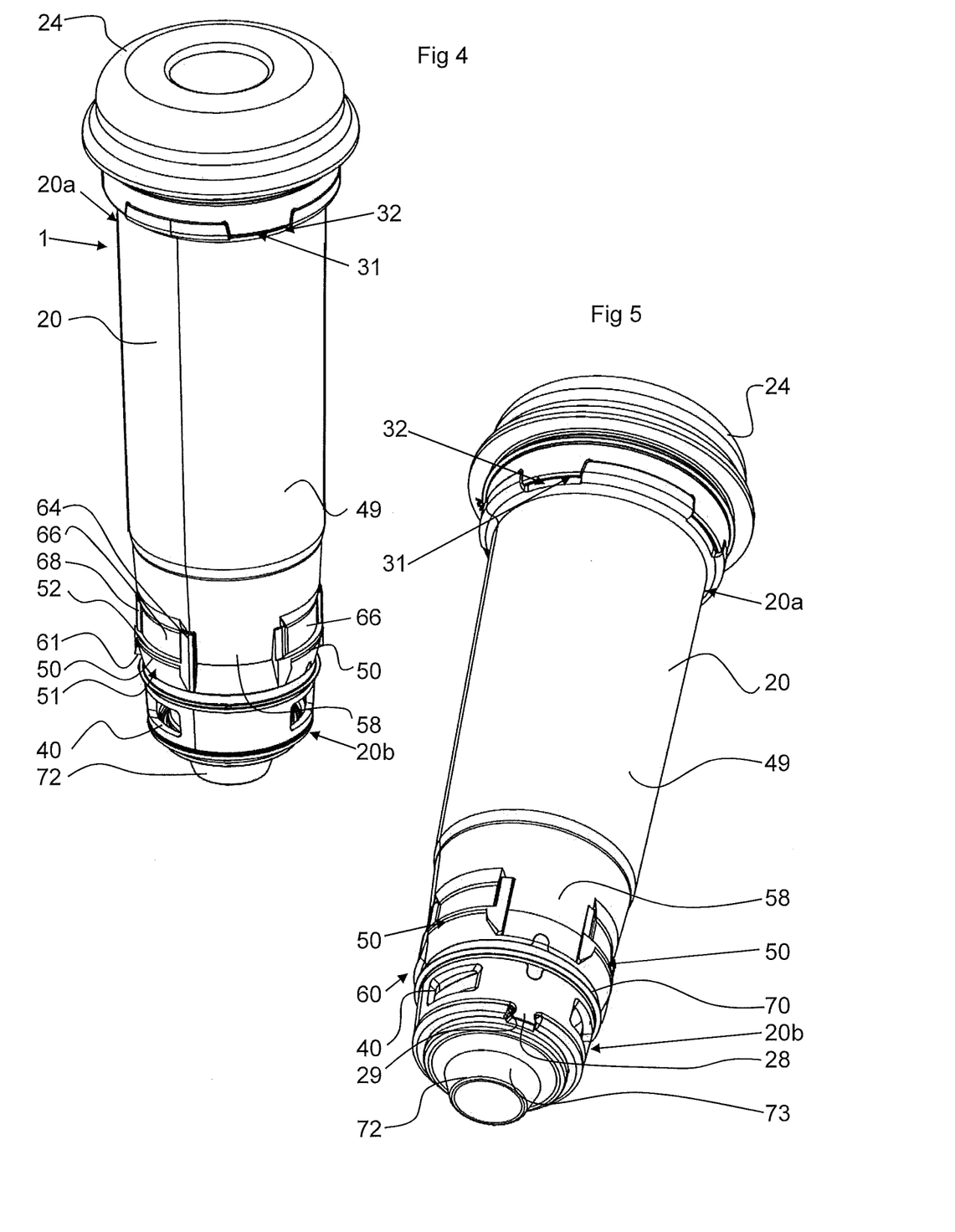
FIG. 4 discloses a perspective view from above of a cartridge of the teatcup in FIG. 1.
FIG. 5 discloses a perspective view from below of the cartridge in FIG. 4.

The cartridge 1, see also FIGS. 4 and 5, comprises an elongated sleeve 20 and a teatcup liner 21, which is premounted in the elongated sleeve 20 and has an inner space 22 for receiving the teat.

The elongated sleeve 20 extends in parallel with the longitudinal central axis x and has an upper end section 20a and a lower end section 20b.

The teatcup liner 21 comprises an upper end portion 21a located at the upper end section 20a of the elongated sleeve 20, a lower end portion 21b located at the lower end section 20b of the elongated sleeve 20, and a barrel portion 21c extending between the upper end portion 21a and the lower end portion 21b.

The cartridge 1 also comprises a pulsation chamber 23, which is formed or enclosed between an inner side of the elongated sleeve 20 and an outer side of the teatcup liner 21, see FIG. 2.

Furthermore, the cartridge 1 comprises a lip member 24, which is attachable or attached to the upper end portion 21a of the teatcup liner 21 by means of a snap connection 24b, see FIG. 2. The lip member 24 comprises a lip 24a, which defines an opening through which the teat is introduced into the inner space 22 of the teatcup liner 21. When attached to the upper end portion 21a, the lip member 24 is securely connected to the upper end portion 21a of the teatcup liner 21 in an axial direction.

In the embodiment disclosed, the barrel portion 21c has, in a rest state, a triangular cross-sectional shape defining three corner portions 25 and three side portions 26. Each side portion 26 is straightened and extends between and connects two of the three corner portion 25, see FIGS. 2, 7 and 9.

It should be noted, that the barrel portion 21c may, in a rest state, also have a circular cross-sectional shape. Moreover, the barrel portion 21c may in principle have any polygonal cross-sectional shape, for instance a square or a pentagonal cross-sectional shape.

The lower end portion 21b of the teatcup liner 21 comprises an annular flange 27 extending outwardly, see FIG. 6. The annular flange 27 abuts an end surface of the lower end section 20b of the elongated sleeve 20, and maintains the axial position of the lower end portion 21b in relation to the elongated sleeve 20.

The barrel portion 21c of the teatcup liner 21 is made of a first material and the lower end portion 21b of the teatcup liner 21 is made of a second material. The second material has a high rigidity in comparison with the first material. The first material may consist of or comprise rubber, black rubber, silicone rubber, elastic polymers, such as Thermoplastic Elastomers, TPE, or any other suitable elastic material. The second material may consist of or comprise a suitable polymer with low elasticity, such as polyeten, polypropene, etc.

Figure 8:
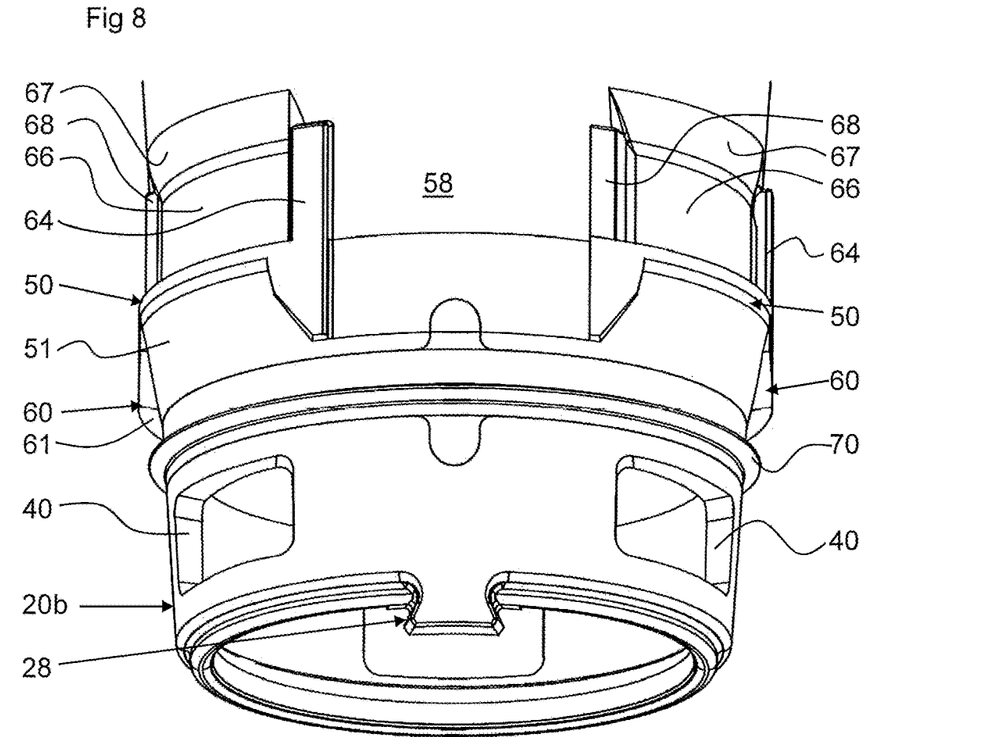
FIG. 8 discloses a perspective view from below of a lower part of an elongated sleeve of the cartridge in FIG. 4.
Figure 9:
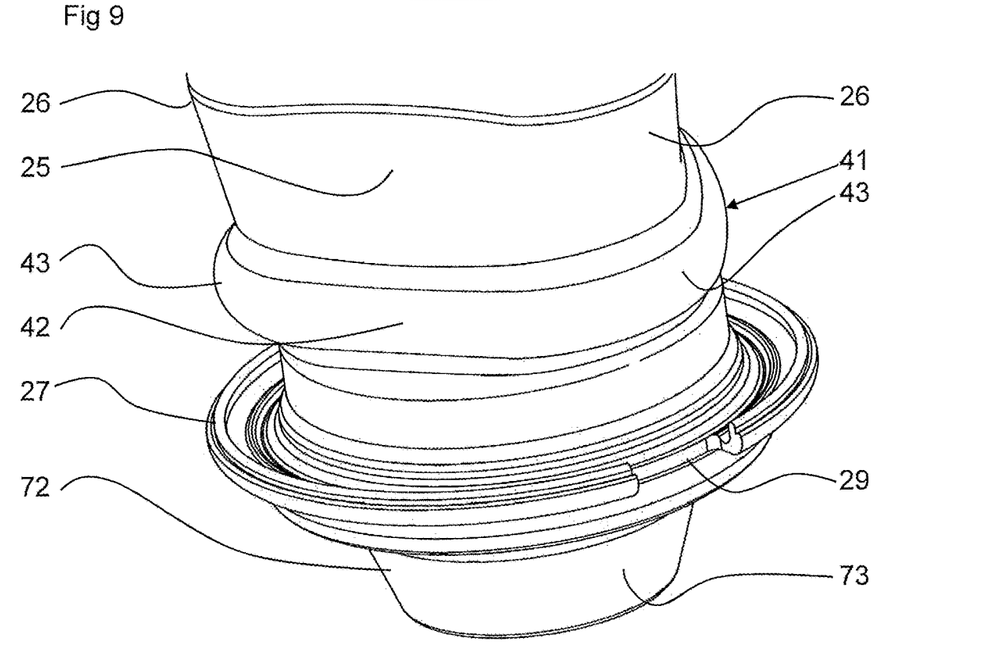
FIG. 9 discloses a perspective view from above of a lower part of a teatcup liner of the cartridge in FIG. 4.

In order to prevent the teatcup liner 21 from being twisted in the elongated sleeve 20, the elongated sleeve 20 comprises a primary locking member 28, see FIG. 8, and the teatcup liner 21 a primary complementary locking member 29, see FIG. 9.

The primary locking member 28 is located at the lower end section 20b of the elongated sleeve 20. More precisely, the primary locking member 28 comprises a protrusion which extends downwardly from the end surface of the lower end section 20b. The primary locking member 28 may have a dovetail shape, as can be seen in FIG. 8.

The primary complementary locking member 29 is provided on the lower end portion 21b of the teatcup liner 21. More precisely, the primary complementary locking member 29 is provided on the annular flange 27. The primary complementary locking member 29 comprises or consists of a recess in the annular flange 27. The recess of the primary complementary member 29 permits the protrusion of the primary locking member 28 to fit in the recess of the primary complementary locking member 29, when the teatcup liner 21 has been mounted in the elongated sleeve 20.

Thus, the primary locking member 28 and the primary complementary locking member 29 engage each other, see FIGS. 8 and 9, to prevent rotation of the teatcup liner 21 in relation to the elongated sleeve 20 around the longitudinal central axis x.

Moreover, the primary locking member 28 and the primary complementary locking member 29 define the rotary position of the teatcup liner 21 in the elongated sleeve 20.

It should be noted that the primary locking member 28 and the primary complementary locking member 29 may comprise more than one protrusion and recess, respectively.

Figure 11:
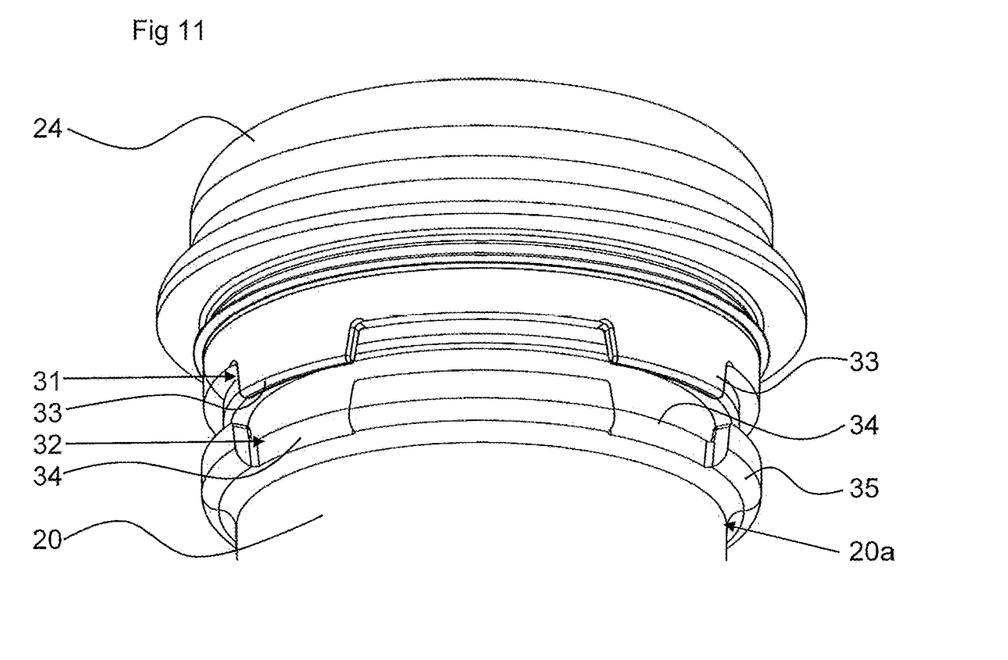
FIG. 11 discloses a perspective exploded view from below a lip member and an upper part of the cartridge in FIG. 4.

Additionally, twisting of the teatcup liner 21 in the elongated sleeve 20, may be prevented by a secondary locking member 31 of the lip member 24, and a secondary complementary locking member 32 of the elongated sleeve 20, see FIGS. 4, 5 and 11.

The secondary locking member 31 comprises four protrusions 33 extending downwardly from a lower end of the lip member 24.

The secondary complementary locking member 32 comprises four recesses 34 in an annular flange 35 extending outwardly at the upper end section 20a of the elongated sleeve 20. The protrusions 33 are configured to interact with the recesses 34 to prevent twisting or rotation of the teatcup liner 21 in relation to the elongated sleeve 20. When the lip member 24 has been attached to the teatcup liner 21, and when the teat cup liner 21 with the lip member 24 has been introduced into the elongated sleeve 20, the protrusions 33 of the secondary locking member 31 fit in a respective one of the recesses 34 of the secondary complementary locking member 32 so that the teatcup liner 21 will be locked in a rotational direction in relation to the elongated sleeve 20.

Thus, the secondary locking member 31 and the secondary complementary locking member 32 engage each other to prevent rotation of the lip member 24 in relation to the elongated sleeve 20, and thus in relation to the teatcup liner 21 around the longitudinal central axis x.

It should be noted that the secondary locking member 31 and the secondary complementary locking member 32 may comprise less than four or more than four protrusions 33 and recesses 34, respectively.

Figure 7:
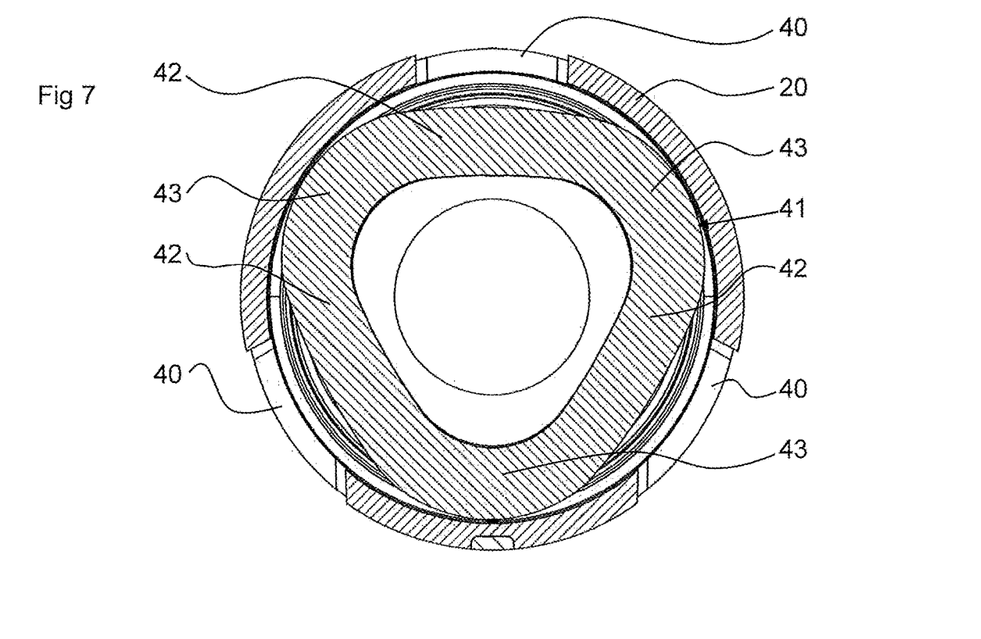
FIG. 7 discloses a cross-sectional view along the line VII-VII in FIG. 6.

In the embodiment disclosed, the elongated sleeve 20 comprises three openings 40, see in particular FIG. 7. Each opening 40 is provided opposite to a respective one of the side portions 26 of the teatcup liner 21, see FIG. 2. Each opening 40 permits passage of a pulsating pressure into and out from the pulsation chamber 23 via the communication channel of the pulse nipple 18 and the closed space 16.

The openings 40 extend through the lower end section 20b of the elongated sleeve 20, and are equidistantly distributed around the lower end section 20b of the elongated sleeve 20.

It should be noted, that the number of openings 40 may be another than three. However, the number of openings 40 may preferably correspond to the polygonal shape of the barrel portion 20, and thus be the same as the number of side portions 26.

The barrel portion 21c comprises a protruding ring 41 projecting outwardly and extending around the barrel portion 21c in the proximity of the lower end portion 21b, see FIGS. 6 and 7. The protruding ring 41 comprises three straightened portions 42. Each straightened portion 42 is axially, or substantially axially, aligned with a respective one of the side portions 26.

The protruding ring 41 thus has a polygonal shape corresponding to the polygonal shape of the barrel portion 21c above the protruding ring 41. Each straightened portion 42 extends between two curved portions 43.

Each straightened portion 42 is located partly opposite to a respective one of the openings 40, as can be seen in FIGS. 6 and 7. Thus, the openings 40 are located axially between the protruding ring 41 and the annular flange 27. One of the straightened portions 42 can be seen through one of the openings 40 in FIG. 10.

The elongated sleeve 20 comprises three separate primary hook members 50 provided circumferentially after each other on an outer surface 49 of the elongated sleeve 20, see FIGS. 1, 4-6, 8 and 10. The primary hook members 50 are equidistantly located after each other. The primary hook member 50 are located at the same axial position.

The outer surface 49 is in the embodiment disclosed tapering from the upper end section 20a to the lower end section 20b.

Each of the primary hook members 50 has a lower slide surface 51 sloping upwardly and outwardly, and a upper hook surface 52 extending inwardly, see FIG. 6. The upper hook surface 52 may extend radially, or substantially radially, with respect to the longitudinal central axis x.

Each of the primary hook members 50 is configured to interact with a respective one of the heel members 6. The primary hook members 50 and the heel members 6 define a primary rotary position of the cartridge 1 in relation to the connecter 2 when each of the primary hook member 50 is aligned with a respective one of the heel members 6.

When being in the primary rotary position, the cartridge 1 is insertable along the longitudinal central axis x into the connector 2. During the introduction of the cartridge 1, the lower slide surface 51 will slide on the heel member 6, especially on the chamfer between the upper surface 9 and the main surface 8, until the heel member 6 passes the lower slide surface 51 of the primary hook member 50. The primary hook member 50 will then snap outwardly so that the hook surface 52 of the primary hook member 50 abuts and is engaged by the lower surface 10 of the heel member 6, see FIG. 2. From this inserted position, the cartridge 1 cannot be removed from the connector 2 by being pulled in an opposite direction along the longitudinal central axis x.

Figure 10:
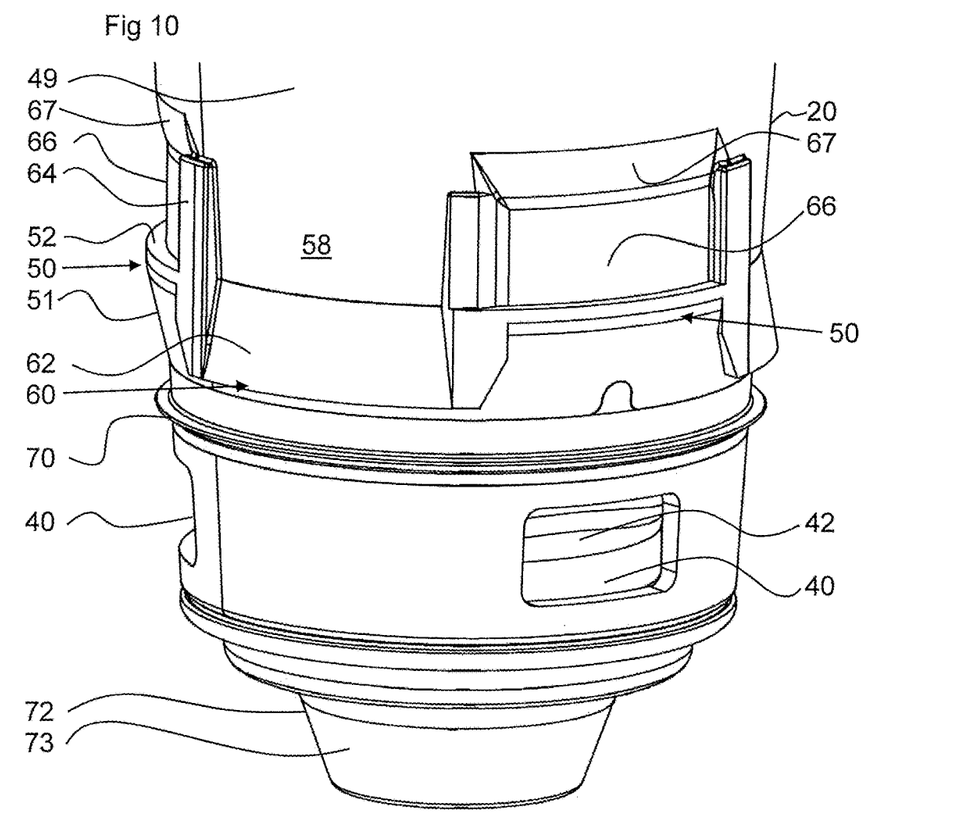
FIG. 10 discloses a perspective view from below of a lower part of the cartridge in FIG. 4.

Moreover, the elongated sleeve 20 comprises three separate passages 58 provided circumferentially after each other on the outer surface 49 of the elongated sleeve 20, see FIGS. 4, 5 and 10. The primary hook members 50 and the passages 58 are thus provided after each other in an alternating order around the outer surface 49 of the elongated sleeve 20. Also the passages 58 are thus equidistantly distributed after each other.

The elongated sleeve 20 also comprises a respective secondary hook member 60 in two of the passages 58, see FIGS. 1 and 4.

Thus, two of the three passages 58 comprises a secondary hook member, see FIG. 10, whereas the third passage 58 has no secondary hook member, see FIG. 8.

Each of the secondary hook members 60 comprises a lower hook surface 61 extending inwardly, and an upper slide surface 62 sloping upwardly and inwardly.

The two secondary hook members 60 are thus configured to interact with a respective one of two of the three heel members 6 to prevent the cartridge 1 from being inserted when the cartridge 1 is not in the primary rotary position. When not in the primary rotary position, the lower hook surface 61 of two of the secondary hook members 60 will engage a respective one of the upper sides 9 of the two of the heel members 6, and thus prevent any further insertion of the cartridge 1 into the connector 2.

In the embodiment disclosed, the elongated sleeve 20 comprises three stop members 64 projecting outwardly from the outer surface 49. Each stop member 64 has an elongated shape and extends axially. Each stop member 64 is provided adjacent to and axially above a respective one of the primary hook members 50.

When the cartridge 1 is in the inserted position in the connector 2, the stop members 64 will interact with the heel members 6 to permit the cartridge 1 to be rotated around the longitudinal central axis x in relation to the connector 1 in a primary direction from the primary rotary position to a secondary rotary position.

In the secondary rotary position, each passage 58 is axially aligned with a respective one of the heel members 6, and the cartridge 1 is removable from the connector 2. The cartridge 1 is in this secondary rotary position movable upwardly along the longitudinal central axis x in relation to the connector 2, wherein the heel members 6 will guided over a respective one of the passages 58. This guiding of the heel members 6 through the passages 58 is facilitated thanks to the fact that one of the passages 58, see FIG. 8, lacks a secondary hook member 60.

Furthermore, the stop members 64 will interact with the heel members 6 to prevent the cartridge 1 from being rotated in a secondary direction, opposite to the primary direction, from the primary rotary position to a secondary rotary position.

In the embodiment disclosed the elongated sleeve 20 comprises three surface areas 66. Each surface area 66 has a circular cylindrical extension and is provided above a respective one of the primary hook members 50. When the cartridge 1 is in the inserted position in the connector 2, each surface area 66 will be opposite to the main surface 8 of a respective one of the heel members 6. Above the surface area 66, a sloping area 67 is provided, which slopes upwardly and outwardly and connects the surface area 66 to the outer surface 49.

Each stop member 64 is provided between one of the surface areas 66 and one of the passages 58.

In the embodiment disclosed, the elongated sleeve 20 comprises three rib members 68 extending outwardly from the outer surface 49. Each rib member 68 has an elongated shape and extends axially. Each rib member 68 is provided adjacent to and axially above a respective one of the primary hook members 50. The rib members 68 has a lower height from the surface areas 66 than the stop members 64 to permit the heel members 6 to be guided over the rib members 68 when being rotated in any direction between the primary rotary position and the secondary rotary position. Each rib member 68 is provided between one of the passages 58 and one of the surface areas 66.

In the embodiment disclosed, the elongated sleeve 20 comprises a seal member 70 which extends around the outer surface 49 of the elongated sleeve 20. The seal member 70 is provided in circumferential groove 71 in the outer surface 49 of the elongated sleeve 20. The circumferential groove 71 is provided axially between the openings 40 and the primary hook members 50. The seal member 70 abuts a lower inner surface 75 of the connector 2 and seals the closed space 16 when the cartridge 1 is in the inserted position, see FIGS. 2, 3 and 6.

In the embodiment disclosed, the lower end portion 21b of the teatcup liner 21 comprises an end nozzle 72 extending beyond the lower end section 20b of the elongated sleeve 20. The end nozzle 72 has a circumferential external surface 73 which abuts the seal surface 17 of the upper portion 15 of the milk conduit 4 when the cartridge 1 is in the inserted position in the connector 2, and when the primary hooks members 50 are engaged by the heel members 6, see FIG. 2.

In the teatcup disclosed, the cartridge 1 may easily be replaced. The operator then grips the teatcup and rotates the cartridge 1 from the primary rotary position to the secondary rotary position by gripping the lip member 24 of the cartridge 1 and rotating it I relation to the connector 2 and the outer shell 3.

Thanks to the primary locking member and the primary complementary locking member 28, 29, and to the secondary locking member and the secondary complementary locking member 31, 32, the teatcup liner will remain in the same rotary position in relation to the elongated sleeve 21, and thus not be twisted.

In the secondary rotary position, the cartridge 1 may then be pulled out of the connector 2 and the outer shell 3, by pulling the lip member 24 along the longitudinal central axis x in relation to the connector 2 and the outer shell 3.

A new cartridge 1 may then be inserted into the connector 2 and the outer shell 3. During the insertion, the cartridge 1 is positioned so that the heel members 6 are aligned with the primary hook members 50, i.e. to the primary rotary position.

The cartridge 1 is pushed further via the lip member 24 into the outer shell 3 and the connector 2 until the primary hook members 50 snaps into engagement with the heel members 6. The rotation of the cartridge 1 is made before the end nozzle 72 has reached the seal surface 17, and thus no twisting forces can be exerted on the teatcup liner 21.

The present invention is not limited to the embodiments disclosed, but may be varied and modified within the scope of the following claims.

The invention claimed is:

1. A cartridge configured to be inserted into a connector to an inserted position to form a teatcup configured to be attached to the teat of an animal to be milked, the connector including at least two heel members provided circumferentially after each other on an inner surface of the connector, and an outer shell, the cartridge comprising:
   an elongated sleeve extending in parallel with a longitudinal central axis and having an upper end section and a lower end section, the elongated sleeve comprising
     at least two separate primary hook members provided circumferentially after each other on an outer surface of the elongated sleeve, each of the primary hook members having a lower slide surface sloping upwardly and outwardly, and an upper hook surface extending inwardly, the at least two primary hook members being configured to engage with a respective one of the heel members of the connector,
     at least one secondary hook member projecting outwardly from the outer surface of the elongated sleeve between two of the at least two primary hook members, the at least one secondary hook member having a lower hook surface extending inwardly and an upper slide surface sloping upwardly and inwardly, the at least one secondary hook member being configured to interact with at least one of the heel members to prevent the cartridge from being inserted when the cartridge is not in a primary rotary position, and
     at least one stop member extending outwardly from the outer surface of the elongated sleeve and being provided adjacent to and axially above one of the primary hook members;
   a teatcup liner pre-mounted in the elongated sleeve and having an inner space for receiving said teat; and
   a pulsation chamber between an inner side of the elongated sleeve and an outer side of the teatcup liner,
   wherein the cartridge is configured to be inserted into the connector such that the outer shell of the connector protects the cartridge.

2. The cartridge according to claim 1, wherein each of the primary hook members is configured to interact with a respective heel member provided circumferentially after each other on the inner surface of the connector,
   wherein the primary hook members and the heel members define the primary rotary position of the cartridge in relation to the connecter, and
   wherein the cartridge is introducible along the longitudinal central axis into the connector when in the primary rotary position.

3. The cartridge according to claim 2, wherein each of the primary hook members is configured to be engaged by a respective one of the heel members when the cartridge is introduced into the connector and is in said primary rotary position.

4. The cartridge according to claim 3, wherein the at least one secondary hook member is configured to interact with at least one of the heel members to prevent the cartridge from being inserted when the cartridge is not in the primary rotary position.

5. The cartridge according to claim 2, wherein the elongated sleeve further comprises at least two separate passages provided circumferentially after each other on the outer surface of the elongated sleeve so that the primary hook members and the passages are provided after each other in an alternating order around the outer surface of the elongated sleeve.

6. The cartridge according to claim 5, wherein the at least one secondary hook member projects outwardly in a respective one of the passages.

7. The cartridge according to claim 1, wherein the stop member is configured to interact with at least one of the heel members to permit the cartridge to be rotated around the longitudinal central axis in relation to the connector between the primary rotary position and a secondary rotary position, in which the cartridge is removable from the connector.

8. The cartridge according to claim 1, wherein the elongated sleeve further comprises at least two surface areas, each of the surface areas having a circular cylindrical extension and being provided above a respective one of the primary hook members.

9. The cartridge according to claim 1, wherein the elongated sleeve further comprises a seal member, which extends around the outer surface of the elongated sleeve and is configured to abut an inner surface of the connector when the cartridge is in the inserted position.

10. The cartridge according to claim 1, wherein the at least two primary hook members comprise three primary hook members.

11. The cartridge according to claim 1, wherein the primary hook members are equidistantly distributed after each other.

12. A teatcup comprising:
a connector including an outer shell; and
the cartridge according to claim 1.

13. The teatcup according to claim 12, wherein the connector comprises at least two heel members, provided circumferentially after each other on the inner surface of the connector,
wherein each of the primary hook members interacts with a respective one of the heel members,
wherein the primary hook members and the heel members define the primary rotary position of the cartridge in relation to the connecter, and
wherein the cartridge is introducible along the longitudinal central axis into the connector to the inserted position when the cartridge is in the primary rotary position.

14. The teatcup according to claim 12, wherein the elongated sleeve comprises at least two separate passages, provided circumferentially after each other on the outer surface of the elongated sleeve, and the at least one secondary hook member projecting outwardly in a respective one of the passages, and
wherein the at least one secondary hook member interacts with at least one of the heel members to prevent the cartridge from being inserted when the cartridge is not in the primary rotary position.

15. The teatcup according to claim 12, wherein the elongated sleeve further comprises at least one stop member extending outwardly from the outer surface and being provided adjacent to and axially above one of the primary hook members, and
wherein the stop member interacts with at least one of the heel members to permit the cartridge to be rotated around the longitudinal central axis in relation to the connector between the primary rotary position and a secondary rotary position, in which the cartridge is removable from the connector.

16. The cartridge according to claim 1, wherein the lower hook surface of the at least one secondary hook member is configured to engage with an upper side of at least one of the heel members when the cartridge is not in the primary rotary position.

* * * * *